US012809410B2

(12) United States Patent
Zlotnik et al.

(10) Patent No.: US 12,809,410 B2
(45) Date of Patent: Nov. 24, 2026

(54) VOLTAGE REGULATION SYSTEM

(71) Applicant: Micron Technology, Inc., Boise, ID (US)

(72) Inventors: Leon Zlotnik, Camino, CA (US); Ekram H. Bhuiyan, Sunnyvale, CA (US)

(73) Assignee: Micron Technology, Inc., Boise, ID (US)

(*) Notice: Subject to any disclaimer, the term of this patent is extended or adjusted under 35 U.S.C. 154(b) by 121 days.

(21) Appl. No.: 18/917,386

(22) Filed: Oct. 16, 2024

(65) Prior Publication Data

US 2025/0155910 A1 May 15, 2025

Related U.S. Application Data

(60) Provisional application No. 63/598,716, filed on Nov. 14, 2023.

(51) Int. Cl.
*G05F 1/573* (2006.01)
*G05F 1/575* (2006.01)

(52) U.S. Cl.
CPC .............. *G05F 1/573* (2013.01); *G05F 1/575* (2013.01)

(58) Field of Classification Search
CPC .. G05F 1/573; G05F 1/575; H02J 9/00; H02J 9/04; H02J 9/06
See application file for complete search history.

(56) References Cited

U.S. PATENT DOCUMENTS

| | | | | |
|---|---|---|---|---|
| 3,430,070 | A | 2/1969 | Marshall, Jr. et al. | |
| 5,179,295 | A | 1/1993 | Mattison et al. | |
| 5,767,717 | A | 6/1998 | Schorn et al. | |
| 6,177,783 | B1 * | 1/2001 | Donohue | H02J 1/102 323/272 |
| 9,568,926 | B2 * | 2/2017 | Su | G05F 1/56 |
| 9,599,672 | B2 | 3/2017 | Abhishek et al. | |
| 2006/0294282 | A1 | 12/2006 | Warner | |
| 2022/0391108 | A1 * | 12/2022 | Kim | G06F 1/3275 |
| 2024/0036596 | A1 | 2/2024 | Zlotnik et al. | |

* cited by examiner

*Primary Examiner* — Carlos Amaya
(74) *Attorney, Agent, or Firm* — Brooks, Cameron & Huebsch, PLLC

(57) ABSTRACT

Control circuitry is coupled to a first voltage regulation circuit and a second voltage regulation circuit. The control circuitry determines that a signal criterion has been met and controls application of a voltage signal generated by the second voltage regulation circuit to stabilize a voltage signal generated by the first voltage regulation circuit. The signal criterion is associated with a current level of a current flowing on a power line input to the first voltage regulation circuit, the second voltage regulation circuit, or both.

18 Claims, 5 Drawing Sheets

VOLTAGE REGULATION SYSTEM

TECHNICAL FIELD

Embodiments of the disclosure relate generally to electronic systems and, in particular, to electronic systems that include a voltage regulation system.

BACKGROUND

Various types of electronic devices such as logic circuits may store and process data. A logic circuit is an electronic circuit that processes digital signals or binary information, which can take on two possible values (usually represented as 0 and 1). The logic circuit can use logic gates to manipulate and transform the signals or binary information. Digital logic circuits can be used in a wide range of electronic devices including, for example, computers, calculators, digital clocks, and many other electronic devices that employ digital processing. Digital logic circuits can be designed to perform specific logical operations on digital inputs to generate digital outputs, and, in some instances, can be combined to form more complex circuits to perform more complex operations.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
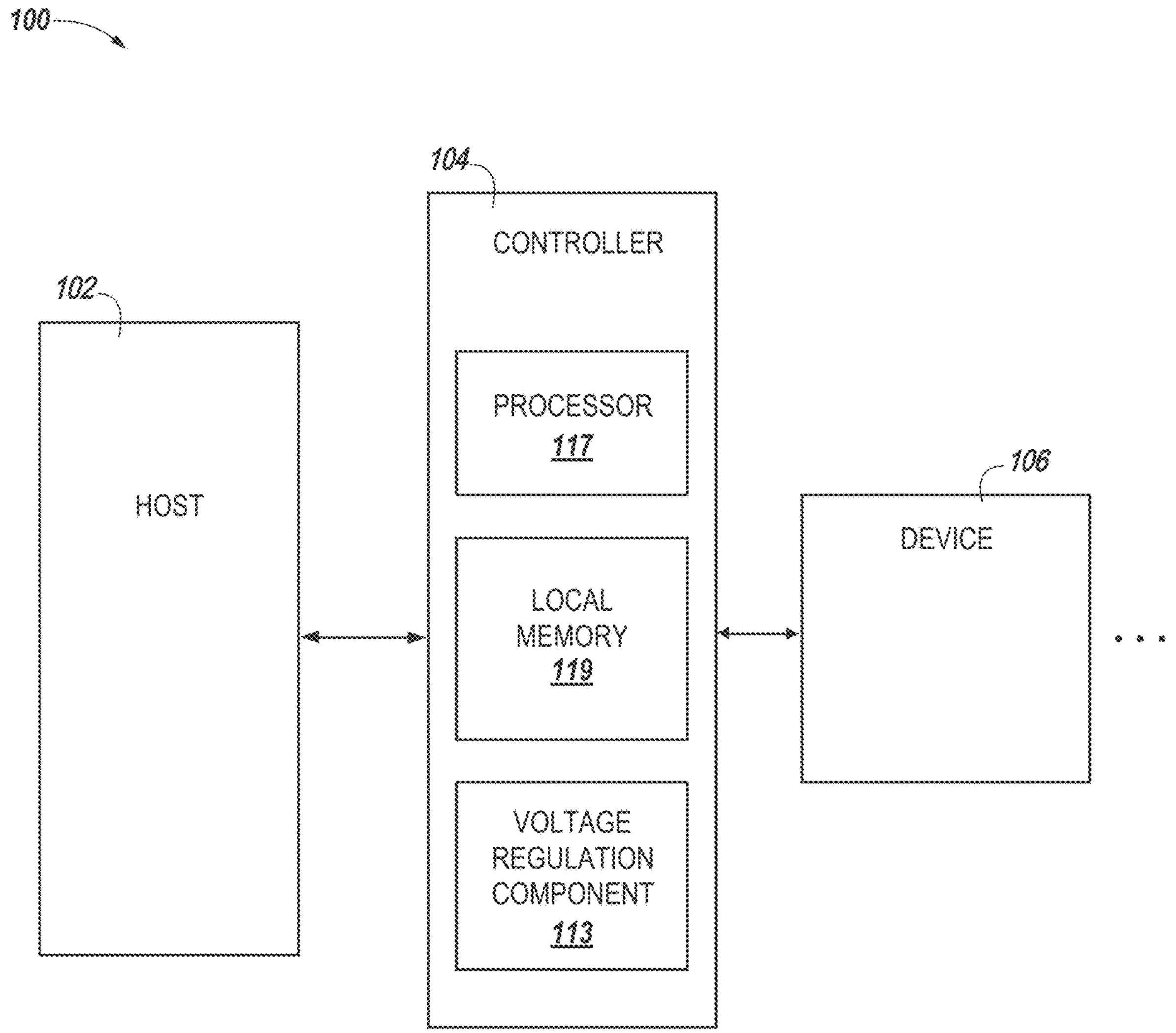
FIG. 1 illustrates an example electronic system that includes a host, a controller, and a device in accordance with some embodiments of the present disclosure.

Aspects of the present disclosure are directed to a voltage regulation system and, in particular, to electronic systems that include a voltage regulation component. Example electronic systems, or portions thereof, in which embodiments of the present disclosure can operate include, but are not limited to a computing system, a system-on-chip (SoC), a networking system, a communication system, a memory system (e.g., a storage system, a memory module, etc.), an artificial intelligence (AI) system, and a digital entertainment system, among various other types of systems or combinations thereof. Examples electronic systems are described below in conjunction with FIG. 1.

Power in systems, such as electronic systems, can be provided by various power supplies (referred to as "external powers supplies), which generally supply a voltage signal or current signal to one or more voltage regulators. Each voltage regulator then seeks to provide the supply voltage that is sufficient for operation of respective components of the electronic system. Often, each of these external power supplies may have a current supply limit, which may lead to the situation in which the regulators operating may not be capable of supplying the required output voltage or current to the components, especially when high performance operation of the system is desired.

Accordingly, one or more additional voltage regulators that operate based on a separate external power supply and are capable of a current supply with a higher margin (e.g., limit) can be utilized to compensate this current supply limit from the external power supplies. Often, these additional voltage regulators may operate in a power-inefficient manner that they consume more power in supplying the same amount of supply voltages as the main voltage regulator. While this desirably necessitates the usage of the additional voltage regulators to be minimized, underuse of the additional voltage regulators may also lead to the power undersupply and/or the overloading of the main voltage regulator, which may eventually lead to a voltage overshoot/undershoot involving a component being powered by the main voltage regulator. Absent the fine-tuned sensing mechanism that can optimize the timing at which usage of the additional voltage regulators is initiated, this particularly poses challenges to the electronic system in controlling the undershooting/overshooting issues.

In order to address these and other deficiencies of current approaches, embodiments of the present disclosure provide the sensing and voltage control mechanism that further allows more fine-tuned timing at which usage of a secondary ("companion") voltage regulator (in addition to a main voltage regulator) is initiated, which eliminates and/or reduce the above-mentioned issues. For example, embodiments of the present disclosure provide the sensing mechanism that indicates whether a current level of the main external power supply (e.g., with which the components including the main voltage regulator operate) is close enough to its current supply limit, which would necessitate the activation of the secondary voltage regulator.

The main external power supply (alternatively referred to as "system power supply) is supplied via an external power line (alternatively referred to as a "system power line" or "main power line") that is often split (e.g., diverted) into multiple power lines (alternatively referred to as "branch power lines"), via which the other components are also fed of the power supply current. Without knowing an actual current level of a current feeding not only into the main regulator voltage, but also into the other components, the timing (e.g., determined based on comparison between the monitored current level and a threshold current level) at which the secondary voltage regulator comes in (e.g., to avoid overloading the main power supply) always have to be determined based on the worst case scenario regarding the current flowing on the system power line to avoid the overloading issues of the main external power supply. While this makes the timing unnecessarily early enough to incur inefficient power consumption, in embodiments of the present disclosure, this timing is determined based on an actual amount of current flowing on the system power line, which eliminates a need to operate the secondary voltage regulator based on the worst case scenario; thereby, avoiding the inefficient power consumption.

FIG. 1 illustrates an example electronic system 100 that includes a host 102, a controller 104, and a device 106 in accordance with some embodiments of the present disclosure. While the electronic system 100 can be considered as an apparatus, embodiments are not so limited. For example, the host 102, the controller 104, and the device 106 can each separately be considered as an apparatus.

The electronic system 100 can be, or can be part of, for example, a desktop computer, laptop computer, televisions, home theater system, gaming console, digital camera, network router and/or switch, printer, scanner, medical device, GPS navigation device, home device (e.g., thermostat, doorbell camera, security camera, smart lock, etc.), wearable device, industrial control system (e.g., automated industrial and/or control device) mobile computing device, a vehicle (e.g., airplane, drone, train, automobile, or other conveyance), Internet of Things (IoT) enabled device, embedded computer (e.g., one included in a vehicle, industrial equipment, or a networked commercial device), system-on-chip (SoC), chipset (e.g., a collection of integrated circuits), tile, Field-Programmable Gate Array (FPGA) structure (e.g., segmented FPGA structure), or other such device.

The electronic system 100 can be, or can include, a computing fabric. As used herein, the term "computing fabric" generally refers to a conveying, multiplexing, network, computing, or communication topology in which components pass data to each other through interconnecting switches, hubs, routers, multiplexers, buses, transmission lines and rings, cables, optical couplers and fibers, electromagnetic devices, or various other means. For example, a "computing fabric" can include various components (e.g., interconnects, crossbars, networks on chip, token rings, etc.) within a computing, memory, data storage and/or processing, network and/or telecommunication, artificial intelligence, control and/or telemetry, digital entertainment and/or other system, that facilitates in-chip and/or inter-chip communication.

The electronic system 100 includes a host 102. The host 102 can include a processor chipset and a software stack executed by the processor chipset. For example, the host 102 can be, or can include, a central processing unit (CPU) or a CPU complex that can be configured to execute an operating system.

The host 102 can be coupled to the controller 104 via a physical and/or logical host interface that operates based on various communication protocols and to provide control, address, data, and other signals to the controller 104 (e.g., to further cause the controller 104 to control the device 106). Examples of the interface between the host 102 and the controller 104 can include, but not limited to, a bus interface (e.g., a serial advanced technology attachment (SATA) interface, a Serial Attached SCSI (SAS) interface, a Serial Attached SCSI (SAS) interface, a Small Computer System Interface (SCSI), a peripheral component interconnect express (PCIe) interface, ISA, etc.), a memory interface (e.g., a double data rate (DDR) interface, a dual in-line memory module (DIMM) interface, an Open NAND Flash Interface (ONFI) interface, an NVM Express (NVMe) interface), a Fibre Channel, an UART interface, an I2C interface, a Serial Peripheral Interface (SPI), an Universal Serial Bus (USB) interface, an ethernet interface, a general-purpose input/output (GIPO) interface, a custom interface, etc.

The controller 104 is communicatively coupled to one or more electronic devices 106 such that signaling can be exchanged therebetween. Non-limiting examples of the devices 106 can include microcontrollers, microprocessors, digital logic circuits, analog circuits, light emitting diodes (LEDs), displays, sensors, motors, actuators, audio amplifiers, radio frequency (RF) circuits, test and measurement instruments (e.g., oscilloscopes, multimeters, etc.), automotive electronics, medical devices, telecommunication equipment, memory devices (e.g., volatile and/or non-volatile memory devices), graphics processing units, processors/co-processors, logic blocks, intellectual property (IP) cores, etc. As used herein, a "core" or "IP core" generally refers to one or more blocks of data and/or logic that form constituent components of an application-specific integrated circuit or field-programmable gate array. The circuit portion areas can be designed, built, and/or otherwise configured to perform specific tasks and/or functions within the systems described herein.

As shown in FIG. 1, the controller 104 can include a processing device (e.g., processor 117) that can execute instructions stored in a local memory 119 to perform various operations described herein. The controller 104 can include various special purpose circuitry in the form of an ASIC, FPGA, state machine, and/or other logic circuitry that can perform operations described herein. As an example, the controller 104 can be a memory controller.

In various embodiments, one or more constituent components (e.g., host 102, controller 104, device 106, etc.) of system 100 can be part of a SoC. In one example, a device 106 itself can correspond to an SoC, while the host 102 and the controller 104 are considered "external" to the SoC. In another example, the host 102 or the controller 104, or both, can be considered as a part of an SoC along with the device 106 being internal or external to the SoC.

As shown in FIG. 1, the controller 104 can include a voltage regulation component 113. The voltage regulation component 113 can be resident on the controller 104. As used herein, the term "resident on" refers to something that is physically located on a particular component. For example, the voltage regulation component 113 being "resident on" the controller 104, for example, refers to a condition in which the hardware circuitry that comprises the voltage regulation component 113 is physically located on the controller 104. The term "resident on" may be used interchangeably with other terms such as "deployed on" or "located on," herein. In some embodiments, the voltage regulation component 113 is part of the host 102, an application, or an operating system.

Figure 2:
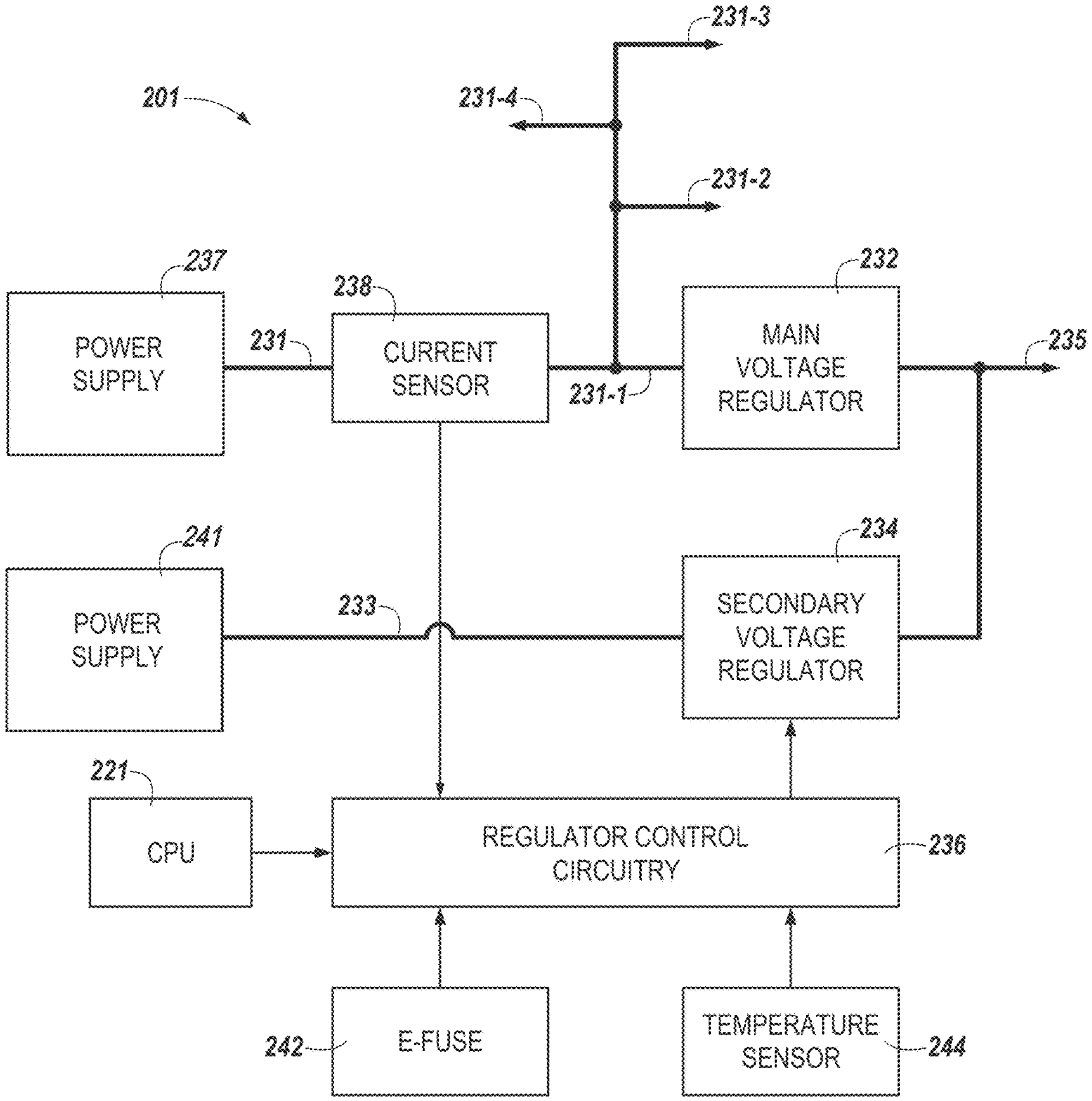
FIG. 2 illustrates an example of a voltage regulation system in accordance with some embodiments of the present disclosure.

Although not shown in FIG. 1 so as to not obfuscate the drawings, the voltage regulation component 113 can include various circuitry to facilitate aspects of the disclosure described herein. For example, the voltage regulation component 113 can include various circuitry to facilitate controlling application of power supply signals generated at voltage regulators, such as voltage regulators 232, 234 illustrated in FIG. 2 or 332, 334 illustrated in FIG. 3. Although not illustrated in FIG. 1, the voltage regulation component 113 can include a number of voltage regulators (e.g., including at least the main voltage regulator 232, 332 and the secondary voltage regulator 234, 334 illustrated in FIG. 2 and FIG. 3, herein) and/or regulator control circuitry (e.g., the control circuitry 236, 336 illustrated in FIG. 2 and FIG. 3, herein). FIG. 2 illustrates an example of a voltage regulation system 201 in accordance with some embodiments of the present disclosure. The example system 201, which can be referred to in the alternative as an "apparatus," can include and/or be part of the voltage regulation component 113 illustrated in FIG. 1. For example, a main voltage regulator 232, a secondary ("companion") voltage regulator 234, regulator control circuitry 236, and/or a current sensor 238, or any combination thereof can be part of the voltage regulation components 113, which in turn can be part of the voltage regulation system 201. In some embodiments, the main voltage regulator 232 or the secondary voltage regulator 234, or both, can be a low dropout regulator (LDO), alternating current (AC)/direct current (DC) converter, DC/DC Buck converter, switching capacitance, etc., although embodiments are not so limited. For example, the main voltage regulator 232 can be a DC/DC converter, while a secondary voltage regulator can be an LDO, although embodiments are not so limited.

The power supply 237 can provide an input power supply signal at least to a portion of the voltage regulation system 201 via the power line 231 (alternatively referred to as a "system power line" or "main power line"). The power supply 237 (e.g., alternatively referred to as "primary power supply") can be an electrical power source that can supply the power supply signal for operation of the voltage regulation system 201 and/or the electronic system 100 illustrated in FIG. 1 (e.g., the controller 104 and/or the device 106 of the electronic system 100). The power supply 237 can, for example, be an electrical outlet, a battery, and/or an AC/DC convertor, among other possible power sources.

As shown in FIG. 2, the power line 231 is split (diverted) into multiple "branch" power lines 231-1, . . . , 231-4 with the branch power line 231-1 coupled to the main voltage regulator 232. The other branch power lines 231-2, . . . , 231-4 can be used to supply power supply signals to the other components, such as those components on a printed circuit board (PCB), those components on a Multi-Chip Module (MCM), and/or analog domain on the SoC, although embodiments are not so limited.

The main voltage regulator 232 is coupled to a power line 231-1, via which a power supply signal is input to the main voltage regulator 232. The secondary voltage regulator 234 is coupled to another system power line 233, via which a power supply signal is provided from the power supply 241 (e.g., alternatively referred to as "secondary power supply") and input to the secondary voltage regulator 234. The power supply 241 can be an electrical power source that can supply the power supply signal for operation of the voltage regulation system 201 and/or the electronic system 100 illustrated in FIG. 1 (e.g., the controller 104 and/or the device 106 of the electronic system 100). The power supply 241 can, for example, be an electrical outlet, a battery, and/or an AC/DC convertor, among other possible power sources.

The main voltage regulator 232 and the secondary voltage regulator 234 are coupled to a power line 235 (e.g., alternatively referred to as a "regulated power line" and which can be a rail to provide a power supply signal from the respective voltage regulator to one or more electrical components to power such components). The main voltage regulator 232 can generate a power supply signal having a voltage regulated from a voltage of the signal received via the power line 231 and apply the generated the power supply signal to the power line 235. Similarly, the secondary voltage regulator 234 can generate a power supply signal having a voltage regulated from a voltage of the signal received via the power line 233 and apply the generated the power supply signal to the power line 235. In some embodiments, a voltage level of the power supply signal being input (e.g., provided, supplied, etc.) to the main voltage regulator can be greater than that of the power supply signal being input to the secondary voltage regulator.

The main voltage regulator 232 along with the secondary voltage regulator 234 can supply power (e.g., via the power line 235) to a circuit portion of the electronic system 100, such as a system-on-chip (SoC). The circuit portion can be a digital domain, or analog domain, or both (e.g., on the SoC) that can include various hardware that form one or more cores (e.g., "intellectual property (IP) cores"). As used herein, a "core" or "IP core" generally refers to one or more blocks of data and/or logic that form constituent components of an application-specific integrated circuit or field-programmable gate array. The circuit portion areas can be designed, built, and/or otherwise configured to perform specific tasks and/or functions within the systems described herein. However, embodiments are not so limited to a particular type of electrical device or circuit to which the main voltage regulator 232 and/or the secondary voltage regulator 234 can provide power supply signals for. For example, the main voltage regulator 232 and/or the secondary voltage regulator 234 can supply their output voltage and/or power supply signals to, but not limited to, microcontrollers, microprocessors, digital logic circuits, analog circuits, Light Emitting Diodes (LEDs), displays, sensors, motors, actuators, audio amplifiers, Radio Frequency (RF) circuits, test and measurement instruments (e.g., oscilloscopes, multimeters, etc.), automotive electronics, medical devices, telecommunication equipment, etc.

A current sensor 238 can be coupled to the power line 231 in a manner that measures a current level of a current flowing on the power line 231. The current sensor 238 can determine a current level of a current flowing on the power line 231 in relation to one or more thresholds (alternatively referred to as "threshold levels"). For example, the current sensors 238 can indicate whether the current level of the current has met or exceeded each threshold.

In one embodiment, the main voltage regulator 232 can operate alone (e.g., the secondary voltage regulator 234 is not in operation) until the indication associated with the current level of a current flowing on the power line is provided to control circuitry 236 from the current sensor 238, which in turn can provide signaling to the secondary voltage regulator 234 to control operation of the secondary voltage regulator 234. As an illustrative, non-limiting example, the main voltage regulator 232 may operate by itself to regulate the voltage applied to the power line 235 (e.g., actively applying a power supply signal to the power line 235) until the current sensor indicates (e.g., determines) that the current level of the current flowing on the power line 231 has met or exceeded a threshold (e.g., higher threshold). Once such indication is provided to the regulator control circuitry 236, the regulator control circuitry 236 can provide signaling to the secondary voltage regulator 234 to cause the secondary voltage regulator 234 to be "active" (e.g., cause the secondary voltage regulator 234 to initiate application of its power supply signal to the power line 235) along with the main voltage regulator 232.

In another embodiment, the secondary voltage regulator 234 can operate alone (e.g., the main voltage regulator 232 is not in operation) until the indication associated with the current level of a current flowing on the power line is provided to control circuitry 236 from the current sensor 238, which in turn can provide signaling to the main voltage regulator 232 to control operation of the main voltage regulator 232. As an illustrative, non-limiting example, the secondary voltage regulator 234 may operate by itself to regulate the voltage applied to the power line 235 (e.g., actively applying a power supply signal to the power line 235) as long as a current level of a current flowing on the power line 231 is relatively low (e.g., until the current sensor 238 indicates (e.g., determines) that the current level of the current flowing on the power line 231 has met or exceeded a lower threshold). Once it is indicated by the current sensor 238 that the lower threshold has been met or exceeded, the regulator control circuitry 236 can provide signaling to the main voltage regulator 232 to cause the main voltage regulator 232 to be "active" (e.g., cause the main voltage regulator 232 to initiate application of its power supply signal to the power line 235). For example, when the lower threshold is determined to have been met or exceeded, the main voltage regulator 232 can be "active" initially along with the secondary voltage regulator 234. In one embodiment, as the current level of the current flowing on the system power line 231 increases (e.g., is determined to have met or exceeded another threshold corresponding to a current level higher than the lower threshold, but lower than the higher threshold mentioned above), the secondary voltage regulator 234 can gradually become "inactive" (e.g., not actively applying a power supply signal to the power line 235) such that the main voltage regulator 232 is active alone. This is to prevent issues such as power noise and voltage disruption caused by abrupt transitions between two voltage regulators 232 and 234. In another embodiment, the secondary voltage regulator 234 can become "inactive" substantially at the same time at which the main voltage regulator 232 became "active" (e.g., in response to the lower threshold is determined to have been met or exceeded). Further, as described above, once the higher threshold described above is indicated as having been met or exceeded, the regulator control circuitry 236 can cause the secondary voltage regulator 234 to be active along with the main voltage regulator 232.

The regulator control circuitry 236 can be coupled to memory 242, a temperature sensor 244, and an CPU 221 (e.g., analogous to the processing unit 121 illustrated in FIG. 1). The memory 242 can be one or more fuses such as an electronic fuse (e-fuse), among other types of memory. The memory 242 can be configured to store a value that corresponds to process variations associated with the electronic system 100 (e.g., the memory die 345 illustrated in FIG. 3). As used herein, a process variation can describe a variation of fabrication parameters. The process variations shown include slow-slow (SS), typical-typical (TT), and fast-fast (FF) process variations that correspond to process corners. However, the process variations shown are exemplary and other process variations can be utilized such as fast-slow and slow-fast, among others. In a number of embodiments, the process variation can be unique to the device (e.g., unique to each memory die, such as the memory die 345) and/or may be a process variation assigned to the electronic system 100 in the unified manner.

The temperature sensor 244 can include hardware and/or firmware configured to measure a temperature and provide the temperature to the regulator control circuitry 236. The temperature sensor 244 can be part of the electronic system (e.g., the electronic system 100 of FIG. 1), a controller (e.g., the controller 104 of FIG. 1), or the devices (e.g., devices 106 of FIG. 1). The temperature sensor 244 can also be part of a host system (e.g., the host 102 of FIG. 1), for example. The temperature sensor 244 can measure the temperature of an electronic system 100 (e.g., system) or a portion of the electronic system 100. For example, the temperature sensor 244 can measure the temperature of a memory array and/or a bank of memory arrays, among others.

In a number of embodiments, the regulator control circuitry 236 can configure (e.g., adjust) a threshold (associated with a current sensor 238) at which the secondary voltage regulator 234 can be "active" (e.g., actively applying aa powers supply signal to its regulated output power line). For example, the control circuitry 236 can (e.g., dynamically) configure this threshold based on information accessed from the memory 242 and/or indications received from the temperature sensor 244. This configuration is to take current leakage (alternatively referred to as "leaky silicon) into account to optimize operations of the main voltage regulator 232 and/or secondary voltage regulator 234. For example, current leakage may increase as the temperature (as measured by the temperature sensor 244) increases and/or as the process variation changes from SS (and/or TT) to FF (and/or TT).

For example, to mitigate the higher than expected currents that can be present due to leaky silicon (indicated from "FF" process variation by, for example, accessing memory 242) and/or a high temperature (as measured by the temperature sensor 244), the regulator control circuitry 236 can lower/decrease the threshold current level (such that the secondary voltage regulator 234 starts operating at an earlier point) to avoid overloading of the main voltage regulator 232 and to further avoid the electronic system 100 and/or the controller 104 from being unnecessarily heated. In contrast, the threshold current level may not be lowered further when the leaky silicon and/or high temperature is not indicated respectively by memory 242 and temperature sensor 244, which eliminates a need for secondary voltage regulator 234 to operate at an earlier point as mentioned above. In some embodiments, the regulator control circuitry 236 can heighten/increase the threshold current level (such that the second voltage regulator 234 starts operating at a further later point) when "SS" or low temperature is indicated respectively by memory 242 and temperature sensor 244.

Figure 3:
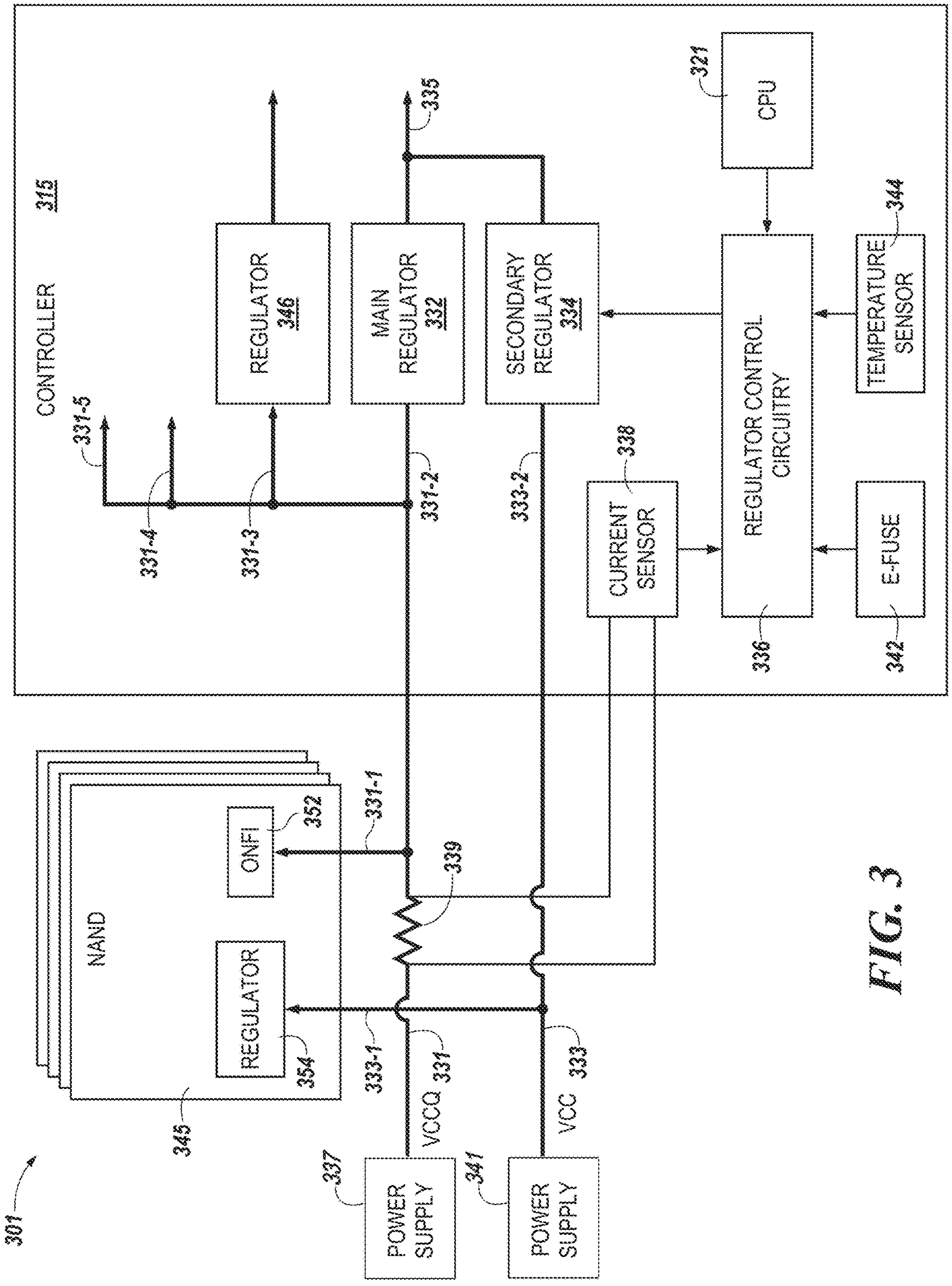
FIG. 3 illustrates another example of a voltage regulation system in accordance with some embodiments of the present disclosure.

FIG. 3 illustrates another example of a voltage regulation system 301 in accordance with some embodiments of the present disclosure. The example system 301, which can be referred to in the alternative as an "apparatus," can include and/or be part of the voltage regulation component 113 illustrated in FIG. 1. For example, a main voltage regulator 332, a secondary ("companion") voltage regulator 334, the regulator 346, regulator control circuitry 336, and/or a current sensor 338, or any combination thereof can be part of the voltage regulation component 113, which in turn can be part of the voltage regulation system 301. In some embodiments, the main voltage regulator 332, the secondary voltage regulator 334, and/or the regulator 346 can be a low dropout regulator (LDO), although embodiments are not so limited.

The voltage regulation system 301 illustrated in FIG. 3 is generally analogous to the voltage regulation system 201 illustrated in FIG. 2 in that the secondary voltage regulators 334 can be active along with the main voltage regulator 332 as controlled by the regulator control circuitry 336 to marginally optimize for the voltage regulation system 301 (as described in association with FIG. 2). Further, the regulator control circuitry 336 can configure (e.g., adjust) a current level of the threshold current level (associated with the current sensor 338) at which the secondary voltage regulator 334 can be active based on information accessed from the memory 342 and/or indications received from the temperature sensor 344. Still, FIG. 3 illustrates further details associated with branch power lines 331-1, . . . , 331-5 (diverted from the system power line 331) and branch power lines 333-1 and 333-2 (diverted from the system power line 333). As an example, the voltage supply on the power line 331 (shown as "VCCQ") can be 1.2 V, while the voltage supply on the power line 333 (shown as "VCC") can be 2.5 V. However, embodiments are not so limited. For example, the voltage supply on the power lines 331 and 331 can be of the same voltage level.

For example, the diverted branch power lines 331-1 and 333-1 are respectively coupled to an ONFI interface 352 and a regulator 354 of the NAND memory die 345. Although not shown in FIG. 3, branch power lines (e.g., the power lines 331-1 and 333-1 respectively diverted from the power lines 331 and 333) can be further coupled to multiple (e.g., NAND) memory dice that may include the same or similar components (e.g., the regulator 354, ONFI interface 352, etc.) as the NAND memory dice 345. The regulator 354 can regulate its output voltage. Although embodiments are not so limited, for example, the input voltage supplied by the power line 333-1 to the regulator 354 can be of 2.5 V, while the output voltage from the regulator 354 can be of 1.5 V with which the other components (not shown) of the NAND memory die 345 are compatible with.

FIG. 3 further illustrates a regulator 346 coupled to the power line 331-3 diverted from the power line 331. The regulator 346 can provide a power supply signal (e.g., with the regulated voltage of 0.7 V) to those components in an always-on (AON) domain on the SoC. The power line 331 can be further diverted into the other power lines, such as the power lines 331-4 and 331-5, which are respectively coupled to and for providing power supply signals (e.g., powering) to the other domains (e.g., on the SoC), such as a Multiport PHY (MPHY) domain, ONFI domain (ONFI interfaces on memory dice different than memory die 345), etc., although embodiments are not so limited.

FIG. 3 further illustrates details associated with how a current level of a current flowing on the power line 331 can be measured. As further illustrated in FIG. 3, a resistor 339 can be located on the power line 331. The resistor 339 is further coupled to the current sensor 338, which measures a current level of the current flowing through the resistor 339 and utilize the measured current level to provide indication (to the regulator control circuitry 336) of whether the measured current level has met or exceeded the threshold current level. However, embodiments are not limited to a particular type of a current sensor that may be utilized to measure a current level of a current flowing on the power line 331. For example, a current sensor that measure a current level of the current flowing on the power line 331 can be a current-mirror-based sensor, magnetic sensors (e.g., hall effect sensors), etc.

In a non-limiting example, an apparatus (e.g., the voltage regulation component 113 illustrated in FIG. 1, herein) can include a first voltage regulation circuit (e.g., the main voltage regulator 232, 332 illustrated in FIG. 2 and FIG. 3, herein) configured to apply a first power supply signal on a first power line (e.g., the power line 235, 335 illustrated in FIG. 2 and FIG. 3, herein). The first voltage regulation circuit 232, 332 is configured to regulate a voltage of a second power supply signal received at the first voltage regulation circuit 232, 332 via a second power supply signal received via a second power line (e.g., the power line 231-1, 331-2 illustrated in FIG. 2 and FIG. 3, herein) diverted from a system power line (e.g., the main power line 231, 331 illustrated in FIG. 2 and FIG. 3, herein) at the first voltage regulation circuit 232, 332. The apparatus can further include a second voltage regulation circuit (e.g., the secondary voltage regulator 234, 334 illustrated in FIG. 2 and FIG. 3, herein) coupled to the first power line 235, 335. The apparatus can further include control circuitry (e.g., the control circuitry illustrated in FIGS. 2-3) coupled to the first voltage regulation circuit 232, 332 and the second voltage regulation circuit 234, 334. The control circuitry 236, 336 can be configured to determine that a current level of a current flowing on the system power line 231, 331 has met or exceeded a threshold. The control circuitry 236, 336 can be further configured to control, based on the determination that the current level of the current flowing on the system power line 231, 331 has met or exceeded the threshold, application of a third power supply signal generated by the second voltage regulation circuit 234, 334.

In some embodiments, the threshold corresponds to a first threshold that corresponds to a current level lower than that of a second threshold. In this example, the control circuitry 236, 336 can be further configured to prevent the second voltage regulation circuit 234, 334 from applying an output voltage to the first power line 235, 335 in response to a current level of the current flowing on the system power line 231, 331 and/or unless the current level of the current flowing on the system power line 231, 331 has met or exceeded the threshold. Further, the control circuitry 236, 336 can be further configured to, in response to the determination that the current level of the current flowing on the system power line 231, 331 has met or exceeded the threshold, cause the second voltage regulation circuit 234, 334 to apply an output voltage to the first power line 235, 335.

In some embodiments, the second voltage regulation circuit 234, 334 can be configured to operate based on a fourth power supply signal. The fourth power supply signal can have the same or different voltage level than that of the second power supply signal.

In some embodiments, the first voltage regulation circuit 232, 332 can be configured to receive the second power supply signal from an external power supply (e.g., the power supply 237, 337 illustrated in FIG. 2 and FIG. 3, herein) via the second power line 231-1, 331-2. The first voltage regulation circuit 232, 332 and the second voltage regulation circuit 234, 334 can be coupled to different external power supplies (e.g., power supplies 237, 241 and 337, 341 illustrated in FIGS. 1-2). The control circuitry 236, 336 can be configured to control the application of the third power supply signal generated by the second voltage regulation circuit 234, 334 to avoid the external power supply coupled to the first voltage regulation from being overloaded.

In some embodiments, the apparatus can further include a memory (which can be an electronic fuse (e-fuse) memory, such as the memory 242, 342 illustrated in FIG. 2 and FIG. 3, although embodiments are not so limited) that is coupled to the control circuitry 236, 336 and configured to store information associated with a process variation associated with at least a part of the apparatus (e.g., via the memory die 345 illustrated in FIG. 3, herein). In this example, the control circuitry 236, 336 can be configured to access the memory to retrieve the information and adjust the threshold based on the information.

In another non-limiting example, a system (e.g., the voltage regulation system 201, 301 illustrated in in FIG. 2 and FIG. 3, herein) can include a first regulation circuit 232, 332 (e.g., the main voltage regulator 232, 332 illustrated in FIG. 2 and FIG. 3, herein) configured to apply, to a first power line (e.g., the power line 235, 335 illustrated in FIG. 2 and FIG. 3, herein). The first regulation circuit 232, 332 is further configured to regulated a voltage of a second power supply signal received at the first regulation circuit 232, 332 via a second power line (e.g., the power line 231-1, 331-2 illustrated in FIG. 2 and FIG. 3, herein) diverted from a system power line (e.g., the system power line 231, 331 illustrated in FIG. 2 and FIG. 3, herein) at the first regulation circuit 232, 332. The system can further include a second regulation circuit 234, 334 (e.g., the secondary voltage regulator 234, 334 illustrated in FIG. 2 and FIG. 3, herein) configured to apply, to the first power line 235, 335, a third power supply signal. The second regulation circuit 234, 334 is further configured to regulate a voltage of a fourth power supply signal received at the second regulation circuit 234, 334. The system can further include a sensor (e.g., the current sensor 238, 338 illustrated in FIG. 2 and FIG. 3, herein) configured to monitor a current level of a current flowing on the system power line 231, 331 based on one or more programmable thresholds. The system can further include control circuitry 236, 336 coupled to the sensor 238, 338, the first regulation circuit 232, 332, and the second regulation circuit 234, 334. The control circuitry 236, 336 can be configured to control application of the third power supply signal in response to an indication provided by the sensor 238, 338 that a current level of the current flowing on the system power line 231, 331 having met or exceeded a threshold.

In some embodiments, the first regulation circuit 232, 332 can be coupled to an external power supply (e.g., the power supply 237, 337 illustrated in FIG. 2 and FIG. 3, herein) via the system power line 231, 331. The control circuitry 236, 336 can be configured to control the application of the third power supply signal generated by the second regulation circuit 234, 334 based on the indication provided the sensor 238, 338 to avoid the external power 237, 337 from being overloaded.

In some embodiments, the sensor 238, 338 can be configured to operate with a plurality of programmable thresholds including a first threshold and a second threshold corresponding to a current level higher than that of the first threshold. The control circuitry 236, 336 can be configured to cause the second regulation circuit 234, 334 alone to apply an output voltage to the first power line 235, 335 until the indication that the current level of the current flowing on the system power line 231, 331 has met or exceeded the first threshold is received from the sensor 238, 338.

Continuing with this example, the control circuitry 236, 336 can be configured to, subsequent to the indication that the current level of the current flowing on the system power line has met or exceeded the first threshold is received from the sensor, cause the first regulation circuit 232, 332 to apply an output voltage to the first power line 235, 335. In one example, the second regulation circuit 234, 334 can become "inactive" substantially at the same time the first regulation circuit 232, 332 became "active" (e.g., is allowed to apply an output voltage to the first power line 235, 335). In another example, the second regulation circuit 234, 334 can be active along with the first regulation circuit 232, 332 even subsequent to the first threshold is determined to have been met or exceeded and at least for a while to allow the second regulation circuit 234, 334 to be gradually inactivated. For example, an output current being applied by the second regulation circuit 234, 334 can be gradually lowered and become "inactive" when a current level of a current flowing on the system power line 231, 331 is determined to have met or exceeded a third threshold (e.g., corresponding to a current level higher than the first threshold but lower than the second threshold).

Once the second regulation circuit 234, 334 became "inactive", the first regulation circuit 232, 332 can be active alone until the indication that the current level of the current flowing on the system power line 231, 331 has met or exceeded the second threshold is received from the sensor 238, 338. The control circuitry can be configured to cause the first regulation circuit 232, 332 and second regulation circuit 234, 334 to apply respective output voltages to the first power line 235, 335 in response to the indication that the current level of the current flowing on the system power line has met or exceeded the second threshold received from the sensor 238, 338.

In some embodiments, the system can further include a temperature sensor (e.g., the temperature sensor 244, 344 illustrated in FIG. 2 and FIG. 3, herein) coupled to the control circuitry 236, 336. The control circuitry 236, 336 is configured to adjust at least one threshold of the one or more thresholds the sensor is configured to operate with based on an indication provided by the temperature sensor 244, 344.

Figure 4:
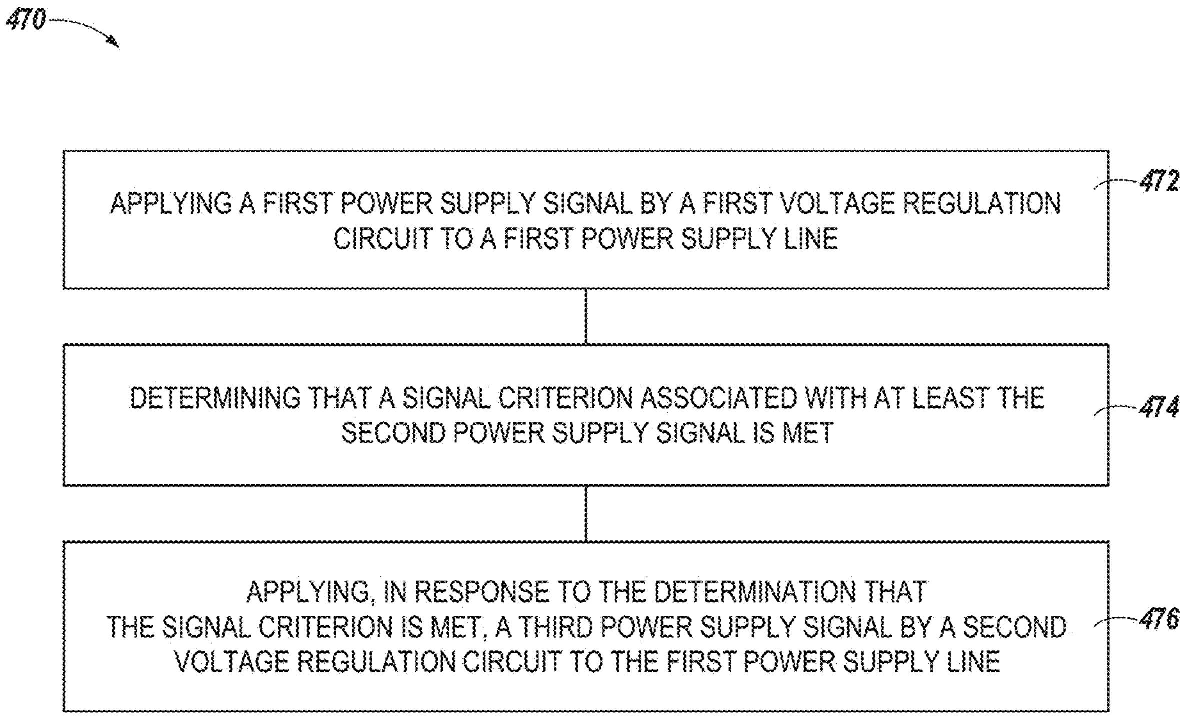
FIG. 4 is a flow diagram corresponding to a method for a voltage regulation system in accordance with some embodiments of the present disclosure.

FIG. 4 is a flow diagram corresponding to a method 470 for a voltage regulation system in accordance with some embodiments of the present disclosure. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 470 is performed by the voltage regulation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 472, the method 470 includes applying a first power supply signal by a first voltage regulation circuit (e.g., the main voltage regulator 232, 332 illustrated in FIG. 2 and FIG. 3, herein) to a first power line (e.g., the first power line 235, 335 illustrated in FIG. 2 and FIG. 3, herein) coupled to a circuit portion area of an electronic system (e.g., the electronic system 100 illustrated in FIG. 1, herein). The first voltage regulation circuit can be configured to regulate a voltage of a second power supply signal received at the first voltage regulation circuit via a second power line (e.g., the power line 231-1, 331-2 illustrated in FIG. 2 and FIG. 3, herein).

At operation 474, the method 470 includes determining that a signal criterion associated with a current level of the second power supply signal is met. At operation 476, the method 470 includes applying, in response to the determination that the signal criterion is met, a third power supply signal by a second voltage regulation circuit (e.g., the secondary voltage regulator 234, 334 illustrated in FIG. 2 and FIG. 3, herein) to the first power line.

In some embodiments, the second power line 231-1, 331-2 can be one of a plurality of power lines (e.g., the power line 231-1, . . . , 231-4, 331-1, . . . , 331-5 illustrated in FIG. 2 and FIG. 3, herein) diverted from a system power line (e.g., the power line 231, 331 illustrated in FIG. 2 and FIG. 3, herein). Determining whether the signal criterion associated with the current level of the second power supply signal is met is based on determining that a current level of a current flowing on the system power line 231, 331 has met or exceeded a threshold.

In some embodiments, the first voltage regulation circuit 232, 332 is further coupled to an external power supply (e.g., the power supply 237, 337 illustrated in FIGS. 2-3) via the system power line 231, 331. In this example, the method can further include controlling the application of the third power supply signal by the second voltage regulation circuit 234, 334 based on the signal criterion to avoid the external power supply 237, 337 from being overloaded.

Continuing with this example, the threshold can be adjusted based on an indication associated with a temperature of an electronic system (e.g., the electronic system 100 illustrated in FIG. 1) comprising the first voltage regulation circuit 232, 332 and the second voltage regulation circuit 234, 334. Further, the threshold can be also adjusted based on information associated with a process variation associated with at least a part of the electronic system 100.

In some embodiments, the first voltage regulation circuit 232, 332 alone can be allowed to apply an output voltage to the first power line 235, 335 unless the signal criterion is determined to have been met. Alternatively speaking, the second voltage regulation 234, 334 circuit can be prevented from applying an output voltage to the first power line 235, 335 unless the signal criterion associated with the current level of the second power supply signal is determined to have met.

Figure 5:
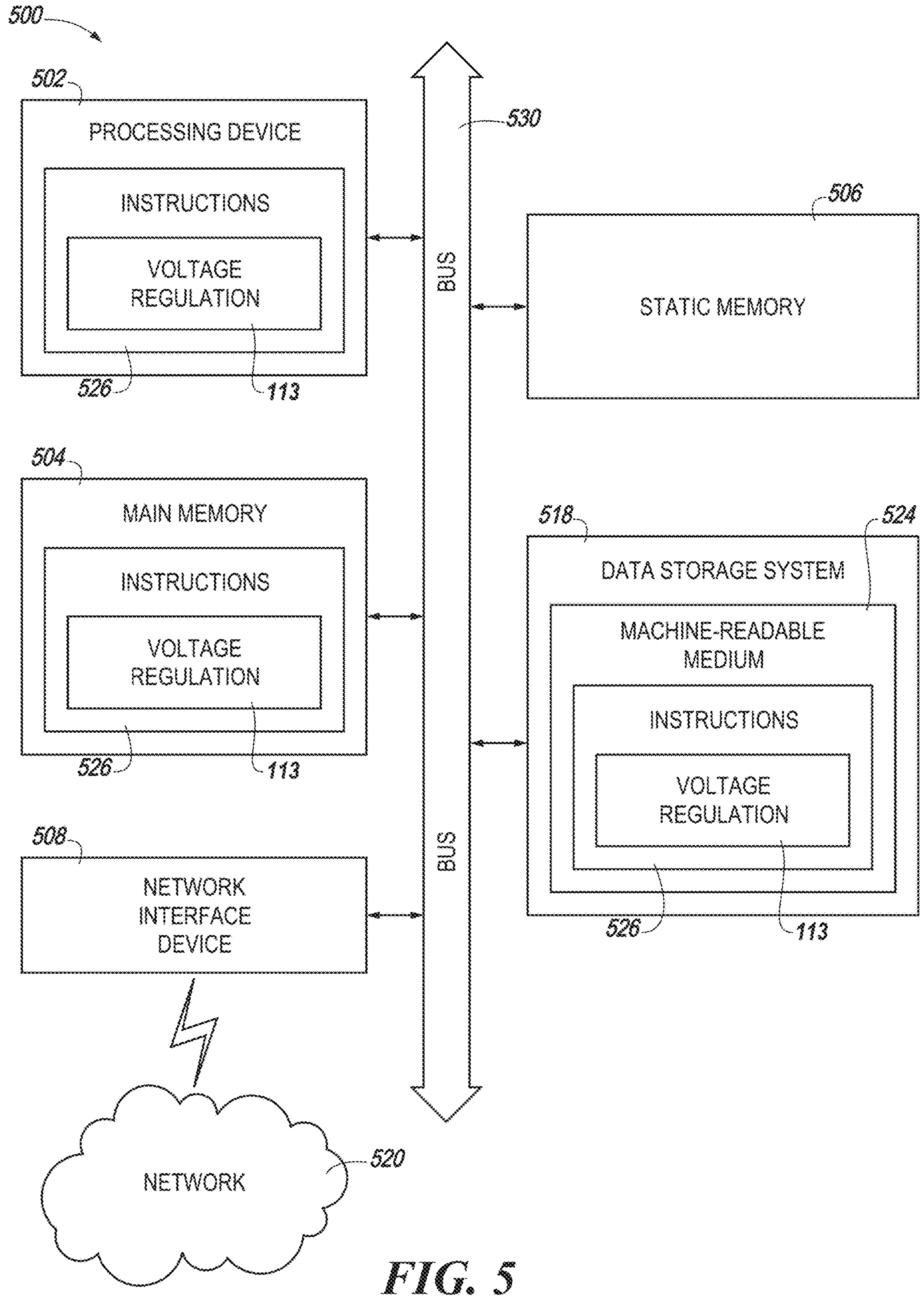
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes an electronic system (e.g., the electronic system 100 of FIG. 1) or can be used to perform the operations of a controller (e.g., to execute an operating system to perform operations corresponding to the voltage regulation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the electronic system 100 of FIG. 1 (e.g., the controller 104 of FIG. 1).

In one embodiment, the instructions 526 include instructions to implement functionality corresponding to voltage regulation component (e.g., the voltage regulation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

applying a first power supply signal by a first voltage regulation circuit to a first power line, wherein the first voltage regulation circuit is configured to regulate a voltage of a second power supply signal received at the first voltage regulation circuit via a second power line, wherein the second power line is one of plurality of second power lines split from a system power line;

determining that a signal criterion associated with at least the second power supply signal is met by determining that a current level of a current flowing on the system power line has met or exceeded a threshold; and applying, in response to the determination that the signal criterion is met, a third power supply signal by a second voltage regulation circuit to the first power line.

2. The method of claim 1, wherein:

the first voltage regulation circuit is further coupled to an external power supply via the system power line; and the method further comprises controlling the application of the third power supply signal by the second voltage regulation circuit based on the signal criterion to avoid the external power supply from being overloaded.

3. The method of claim 2, further comprising:

adjusting the threshold based on an indication associated with a temperature of an electronic system comprising the first voltage regulation circuit and the second voltage regulation circuit; or adjusting the threshold based on information associated with a process variation associated with at least a part of an electronic system.

4. The method of claim 1, further comprising preventing the second voltage regulation circuit from applying an output voltage to the first power line unless the signal criterion associated with the current level of the second power supply signal is determined to have been met.

5. An apparatus, comprising:

a first voltage regulation circuit configured to apply a first power supply signal to a first power line, wherein the first voltage regulation circuit is further configured to regulate a voltage of a second power supply signal received at the first voltage regulation circuit via a second power line diverted from a system power line;

a second voltage regulation circuit coupled to the first power line; and control circuitry coupled to the first voltage regulation circuit and the second voltage regulation circuit, wherein the control circuitry is configured to:

determine that a current level of a current flowing on the system power line has met or exceeded a first threshold corresponding to a current level lower than that of a second threshold;

control, based on the determination that the current level of the current flowing on the system power line has met or exceeded the first threshold, application of a third power supply signal generated by the second voltage regulation circuit; and prevent the second voltage regulation circuit from applying an output voltage to the first power line in response to a determination that the current level of the current flowing on the system power line has met or exceeded the first threshold and unless the current level of the current flowing on the system power line has met or exceeded the second threshold.

6. The apparatus of claim 5, wherein the second voltage regulation circuit is configured to operate based on a fourth power supply signal having a same voltage level than that of the second power supply signal.

7. The apparatus of claim 5, wherein the second voltage regulation circuit is configured to operate based on a fourth power supply signal having a different voltage level than that of the second power supply signal.

8. The apparatus of claim 5, wherein the control circuitry is further configured to, in response to the determination that the current level of the current flowing on the system power line has met or exceeded the threshold, cause the second voltage regulation circuit to apply an output voltage to the first power line.

9. The apparatus of claim 5, wherein the first voltage regulation circuit and the second voltage regulation circuit are coupled to different external power supplies.

10. The apparatus of claim 5, wherein:

the first voltage regulation circuit is configured to receive the second power supply signal from an external power supply via the second power line; and the control circuitry is configured to control the application of the third power supply signal generated by the second voltage regulation circuit to avoid the external power supply coupled to the first voltage regulation circuit from being overloaded.

11. The apparatus of claim 5, further comprising a memory configured to store information associated with a process variation associated with at least a part of the apparatus and coupled to the control circuitry, wherein the control circuitry is configured to:

access the memory to retrieve the information; and
adjust the first threshold based on the information.

12. A system, comprising:

a first regulation circuit configured to apply, to a first power line, a first power supply signal, wherein the first regulation circuit is further configured to regulate a voltage of a second power supply signal received at the first regulation circuit via a second power line diverted from a system power line;

a second regulation circuit configured to apply, to the first power line, a third power supply signal, wherein the second regulation circuit is further configured to regulate a voltage of a fourth power supply signal received at the second regulation circuit;

a sensor configured to:

operate with a plurality of programmable thresholds including a first threshold and a second threshold corresponding to a current level higher than that of the first threshold; and monitor a current level of a current flowing on the system power line based on the plurality of programmable thresholds; and control circuitry coupled to the sensor, the first regulation circuit, and the second regulation circuit, the control circuitry configured to:

control application of the third power supply signal in response to an indication provided by the sensor that a current level of the current flowing on the system power line has met or exceeded a threshold; and cause the second regulation circuit alone to apply an output voltage to the first power line until the indication that the current level of the current flowing on the system power line has met or exceeded the first threshold is received from the sensor.

13. The system of claim 12, wherein:

the first regulation circuit is coupled to an external power supply via the system power line; and the control circuitry is configured to control the application of the third power supply signal generated by the second regulation circuit based on the indication provided the sensor to avoid the external power from being overloaded.

14. The system of claim 12, wherein the control circuitry is configured to, subsequent to the indication that the current level of the current flowing on the system power line has met or exceeded the first threshold is received from the sensor:

cause the first regulation circuit alone to apply an output voltage to the first power line until the indication that the current level of the current flowing on the system power line has met or exceeded the second threshold is received from the sensor.

15. The system of claim 14, wherein the control circuitry is configured to, in response to the indication that the current level of the current flowing on the system power line has met or exceeded the first threshold:

cause the second regulation circuit to not apply an output voltage to the first power line substantially simultaneously with the time at which the first regulation circuit is allowed to apply an output voltage to the first power line; or cause an output current being supplied by the second regulation circuit to be gradually decreased, while an output current being supplied by the first regulation circuit is caused to be increased.

16. The system of claim 12, wherein the control circuitry is configured to cause the first and second regulation circuits to apply respective output voltages to the first power line in response to the indication that the current level of the current flowing on the system power line has met or exceeded the second threshold received from the sensor.

17. The system of claim 12, further comprising a temperature sensor coupled to the control circuitry, wherein the control circuitry is configured to adjust at least one threshold of the one or more thresholds the sensor is configured to operate with based on an indication provided by the temperature sensor.

18. An apparatus, comprising:

a first voltage regulation circuit configured to apply a first power supply signal to a first power line, wherein the first voltage regulation circuit is further configured to regulate a voltage of a second power supply signal received at the first voltage regulation circuit via a second power line diverted from a system power line;

a second voltage regulation circuit coupled to the first power line;

a memory configured to store information associated with a process variation associated with at least a part of the apparatus; and control circuitry coupled to the first voltage regulation circuit, the second voltage regulation circuit, and the memory, wherein the control circuitry is configured to:

determine that a current level of a current flowing on the system power line has met or exceeded a threshold; and control, based on the determination that the current level of the current flowing on the system power line has met or exceeded the threshold, application of a third power supply signal generated by the second voltage regulation circuit; and wherein the control circuitry is further configured to:

access the memory to retrieve the information; and
adjust the first threshold based on the information.

* * * * *